US006005560A

United States Patent [19]
Gill et al.

[11] Patent Number: 6,005,560
[45] Date of Patent: Dec. 21, 1999

[54] MULTI-MEDIA PROJECT MANAGEMENT AND CONTROL SYSTEM

[75] Inventors: Timothy Earl Gill, Denver; Kevin David Murray, Westminster; John David Williams, Jr., Littleton; Bradley Neal Woods, Boulder; Julie Lynn Bucknam, Denver, all of Colo.

[73] Assignee: Quark, Inc., Denver, Colo.

[21] Appl. No.: 08/891,612

[22] Filed: Jul. 14, 1997

Related U.S. Application Data

[63] Continuation-in-part of application No. 08/375,163, Jan. 18, 1995, abandoned, which is a continuation of application No. 07/955,312, Oct. 1, 1992, abandoned.

[51] Int. Cl.[6] .............................. G06T 1/00; G09G 1/14
[52] U.S. Cl. ........................................ 345/302; 345/115
[58] Field of Search .................................. 345/302, 331, 345/332, 330, 342; 707/513, 517, 526, 500

[56] References Cited

U.S. PATENT DOCUMENTS

| | | | |
|---|---|---|---|
| 4,905,163 | 2/1990 | Garber et al. | 364/513 |
| 5,008,853 | 4/1991 | Bly et al. | 364/900 |
| 5,063,495 | 11/1991 | MacPhail | 395/650 |
| 5,181,162 | 1/1993 | Smith et al. | 364/419 |
| 5,214,755 | 5/1993 | Mason | 395/147 |
| 5,226,143 | 7/1993 | Baird et al. | 395/425 |
| 5,337,407 | 8/1994 | Bates et al. | 395/153 |
| 5,481,663 | 1/1996 | Satake | 395/146 |
| 5,572,164 | 11/1996 | Judson | 395/793 |
| 5,592,602 | 1/1997 | Edmunds et al. | 395/174 |

FOREIGN PATENT DOCUMENTS 91103011   2/1991   European Pat. Off. .

OTHER PUBLICATIONS

*Microsoft Word for Windows User's Reference* Microsoft Corporation 1989, pp. 140, 241–260, 388–390, 399–400.

*Primary Examiner*—Stephen S. Hong
*Assistant Examiner*—Alford W. Kindred
*Attorney, Agent, or Firm*—Duft, Graziano & Forest, PC

[57] ABSTRACT

A multi-media presentation system is disclosed for coordinating access to multi-media presentation data and related information. The multi-media presentation data typically includes text, image data and layout data. The related information is stored in an item header file, as well as in a number of records. The system includes a network of computers including computers dedicated to performing certain tasks related to obtaining multi-media presentation data and such related information. To coordinate the multi-media presentation process, the ability to modify content contained in an item file is limited while certain of the records that include useful information related to the same item file are separately available for other network staff members. The system also generates watch records to notify staff members of the current status of, availability of, or to provide other information related to, a multi-media object of interest.

10 Claims, 5 Drawing Sheets

MULTI-MEDIA PROJECT MANAGEMENT AND CONTROL SYSTEM

CROSS REFERENCE TO RELATED APPLICATIONS

This application is a continuation-in-part of U.S. patent application Ser. No. 08/375,163, filed Jan. 18,1995, which is a continuation of U.S. patent application Ser. No. 07/955,312, filed Oct. 1, 1992, both now abandoned and titled Distributed Publication System with Simultaneous Separate Access To Publication Data And Publication Status Information. This application is also related to U.S. patent application Ser. No. 08/753,982, filed Dec. 4, 1996 and titled Method And Apparatus For Generating Multi-Media Presentations.

FIELD OF THE INVENTION

The present invention relates to systems which manage the creation and editing of a multi-media presentation, which comprises a plurality of multi-media objects, by controlling the task assignments associated with the multi-media objects and, in particular, to a system that enables a plurality of designers, editors and managers to concurrently access both the multi-media presentations and their component multi-media objects that are managed by this system.

PROBLEM

It is a problem in the magazine and newspaper publishing industry to manage and coordinate the efforts required by the publication staff to produce the desired published document. Publications are typically labor-intensive in that they require substantial effort from and coordination among the publication staff members: designers, editors, project designers, art directors and publication managers. The publication managers direct the focus of the publication and coordinate the publication process to ensure that deadlines are met. The project designers and art directors are concerned with the presentation of the publication, which includes page organization, layout, and image content. The designers and editors are primarily concerned with the textual content of the publication. In the typical case, each page of the publication can undergo numerous revisions from any of the above mentioned staff members. Since many of the revisions provided by the staff members impact the work products of other staff members, each revision to the content of the publication must be done in close coordination with all of the staff members. Thus, if the project designers change a page layout such that the space allocated for the text of an article changes, then the editor and/or designer responsible for that article is informed so that the article can be modified to fit the new allocated area. It is therefore desirable to automate the publication process so that greater productivity gains can be realized and the staff members have tools adapted to the work products produced in the print document publication industry.

U.S. patent application Ser. No. 08/375,163 discloses a layout driven publication management system that manages and coordinates access by staff members to the information that relates to the publication items which comprise the printed publication. The publication information can include text, image data and/or layout data for a particular print medium publication item. Each publication item has a publication item file associated therewith that comprises: a file header of publication item information, a content area that contains the publication item text or image data, and a geometry area that contains data which defines the location, orientation and shape of the layout area for this publication item. The publication management system also includes a plurality of utilities that control publication item data transfers among the network of interconnected processors used by the staff members. Such utilities include publication item file check-in and check-out utilities whereby a staff member is able to store or retrieve, respectively, a particular publication item file. Additional utilities provide notifications to staff members and answer queries of staff members related to publication item files such as a change in the publication item file status or content.

A limitation of this publication management system is that it is architected solely for the print medium, with all of the above-noted components being layout driven and directed to the management of the creation of text and graphics content which content is developed on a custom basis to fit the specified layout areas assigned to the publication items which make up the resultant printed publication. Therefore, this implementation of the publication management system is not equipped to process multi-media presentations and their multi-media objects components, since multi-media is a content driven paradigm and the multi-media objects have characteristics that are not considered in this implementation of the publication management system. There is therefore a need in the field of multi-media presentations for a multi-media project management and control system that can perform multi-media presentation management and control functions to thereby enable a team of multi-media developers to operate in close coordination, in a manner similar to that available in the print industry, to develop multi-media projects.

SOLUTION

The above described problems are solved and a technical advance achieved in the field by the multi-media project management and control system of the present invention which functions to manage the development of a multi-media presentation by controlling the task assignments associated with the retrieval, development and integration of the plurality of multi-media objects which comprise the multi-media presentation. The multi-media presentation is content driven rather than layout driven as in the print medium case and the management of the multi-media project must follow this different paradigm.

The multi-media project management and control system has a number of different data bases for storing multi-media object data and information related to such multi-media object data so that more than one staff member is able to simultaneously obtain information relating to a particular multi-media object. As a consequence, a number of different staff members involved in creating a multi-media presentation, including designers, editors, project designers, art directors and multi-media presentation managers, can be working on the same multi-media presentation at the same time without interference. The multi-media project management and control system maintains multi-media object records and provides notification information and query responses that relate to the status and/or modification of any of the multi-media object files. Because such notifications or query responses are automatically provided, updates are received by staff members in a timely manner and this ensures the accuracy of this information relating to the multi-media object.

These multi-media object records include header records, each of which is a copy of a multi-media object file header associated with a particular multi-media object. These header records are used by the multi-media project management and control system to grant staff members access to the corresponding multi-media object file. Each multi-media object header record includes information such as a check-out name field that identifies the staff member that has the particular multi-media object file checked-out for exclusive use, a status of the multi-media object and a deadline date associated with the multi-media object, as well as other multi-media object information. Each multi-media object also has an associated multi-media object summary record which includes a field for storing the identity of the staff member that presently has exclusive use of the multi-media object header record, another field that indicates how the multi-media object header record and multi-media object file header are being used and a reference field related to identification of staff members waiting for access to the particular multi-media object file that corresponds to the summary record. The multi-media project management and control system provides access to the multi-media object header record and the multi-media object summary record, for a particular multi-media object file, to two different staff members at the same time, while yet another staff member is able to access the multi-media object file that is associated with these two records. The multi-media project management and control system also maintains watch records and determines whether a file notification or a query notification should be provided to staff members due to one of a number of predetermined changes occurring to a multi-media object.

These capabilities are available in the print medium for the classes of print items which include: articles, pictures, and layouts. However, the multi-media project management and control system extends these capabilities to multi-media objects by creating multi-media object file classes which serve the various multi-media objects, such as: run time movies, animation, pop-up menus, interactive queries, audio, moving objects, and any other dynamic data. These additional classes are seamlessly incorporated into the publication control environment of print medium classes by the use of multi-media object file administration processes which create custom headers for these multi-media objects and enable the staff members to define custom treatments for these new classes. The basic class structure of the print medium is followed by the multi-media project management and control system and the class transformations provided by this system enable the publication management environment of the print medium to be extended to the realm of multi-media presentations.

DETAILED DESCRIPTION

Figure 1:
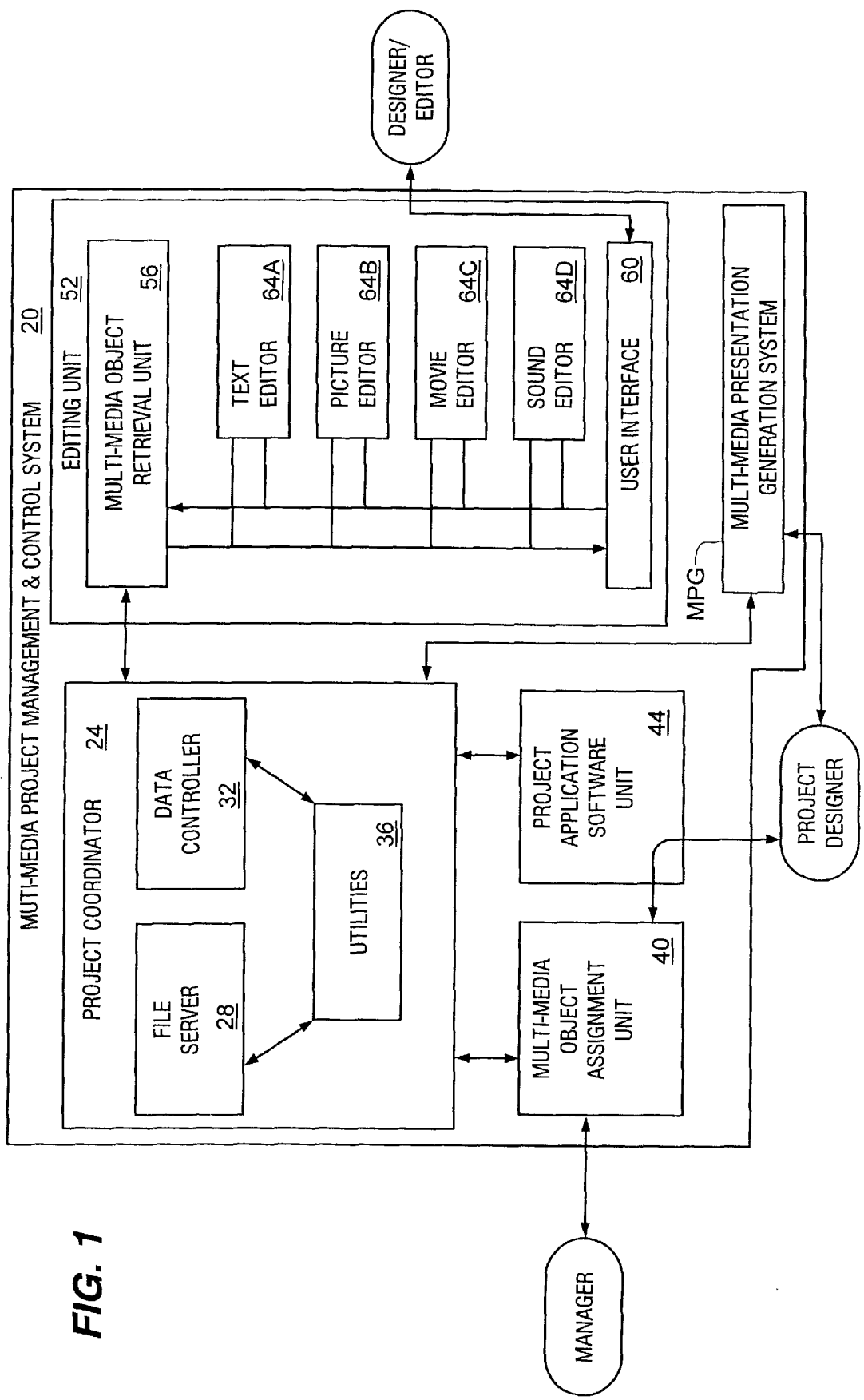
FIG. 1 illustrates a high level block diagram of the multi-media project management and control system.

FIG. 1 illustrates in block diagram form the major architectural components of the multi-media project management and control system 20 of the present invention. The multi-media project management and control system 20 typically comprises a plurality of networked processors or workstations as is well known in the multi-media presentation generation industry. The various components described herein are implemented on ones of these processors, and each staff member typically has a processor at which they perform their assigned tasks. The exact implementation of the hardware backbone of this system is secondary to this description and is noted herein where appropriate to clarify the description of the multi-media project management and control system 20.

The multi-media project management and control system 20 includes a project coordinator 24 that coordinates the workflow between the staff members who are responsible for the various portions of a multi-media presentation development effort. In particular, the project coordinator 24 manages and communicates work products among staff members by providing a centralized repository for all multi-media objects in file server 28. Access to this library of multi-media objects is coordinated through a check-in/check-out mechanism in the project coordinator 24 in combination with a notification mechanism that notifies staff members of multi-media presentation changes that can effect their work products. The project coordinator 24 includes a file server 28, a data controller 32 and a collection of utility programs 36. The file server 28 provides access to all persistent file storage for communally accessed multi-media objects. The data controller 32 controls the access to all multi-media object files that reside on the file server 28. In addition, the data controller 32 also provides staff members with multi-media object description information ("file notification"). This notification mechanism automatically notifies staff members of changes to a specific multi-media object file and enables staff members to input a query notification that designates multi-media object changes that are to be monitored. Utility programs 36 provide the high level functionality of the project coordinator 24 such that the project coordinator 24 can be viewed as a data server of a client-server software architecture. Thus, software processes requesting project coordinator 32 services are considered "client applications" which make requests of the project coordinator 24 via the utility programs 36. The utility programs 36: communicate with the data controller 32 to control access to multi-media object files supplied by the file server 28 and provide staff member client applications with an interface to receive notification of multi-media presentation changes; communicate with the file server 28 to read and write multi-media object files; and transfer multi-media object information to/from staff members via presently executing client applications.

The multi-media project management and control system 20 also includes at least the following client applications: a project application software unit 44, a multi-media object assignment unit 40, and an editing unit 52 and at least one instance of a multi-media presentation generation system MPG. The project application software unit 44 can be any multi-media presentation project application which communicates with the other software programs of the multi-media project management and control system 20. The multi-media object assignment unit 40 allows an assignor (a project designer or a manager) to assign a multi-media object to a designer/editor or to change various assignment attributes, such as due date and due time. Text editing unit 52 is used to create and modify the text of a multi-media object and includes a multi-media object retrieval unit 56, a user interface 60 and a text editor 64. The multi-media object retrieval unit 56 retrieves, and optionally checks-out for exclusive use, multi-media objects from the project coordinator 24. In addition, the multi-media object retrieval unit 56 issues requests to display each retrieved multi-media object, via a user interface 60, to the designer/editor. To accomplish this, multi-media object request information flows from the designer/editor to the user interface 60 and on to the multi-media object retrieval unit 56 for multi-media object retrieval from the project coordinator 24. Once the multi-media object is retrieved, display options are set and the multi-media object is presented to the user interface 60 to be displayed. The multi-media object retrieval unit 56 is also connected to a plurality of editing components which are illustrated as the text editor 64A, picture editor 64B, movie editor 64C, sound editor 64D to optionally edit the multi-media object. The editors 64A–D are interactive editors that enables a designer/editor to modify an existing multi-media object retrieved from the file server 28. These elements can be commercially available editing tools which are installed on various ones of the processors which comprise the network which is used to implement the multi-media project management and control system 20. Alternatively, some of the functionality associated with these editors is available in the multi-media presentation generation system MPG, as is described below. The specific implementation of the editing elements is a matter of design choice and both options are disclosed herein to illustrate the capabilities of the multi-media project management and control system 20. In addition to displaying the multi-media object to the designer/editor, the user interface 60 also, at the request of the designer/editor, can check-in a modified version of a previously checked-out multi-media object file to the project coordinator 24.

Types of Media—Multi-media Project and Management System.

The multi-media project management and control system 20 processes multi-media objects which comprise the print medium types of: articles, pictures, and layouts, as well as the multi-media types of: run time movies, animation, pop-up menus, interactive queries, audio, moving objects, and any other dynamic data. The integration of the multi-media types of data into the multi-media presentation to create a multi-media multi-media presentation is accomplished by adapting the existing print medium publication management system to the multi-media environrrfent in a manner that is transparent to the staff members and extends the features available to the print medium to the multi-media environment. This transformation is accomplished by the use of multi-media presentation file classes which serve the various multi-media multi-media objects. These additional classes are seamlessly incorporated into the multi-media presentation control environment of print medium classes by the use of multi-media presentation file administration processes which create custom headers for these multi-media multi-media objects and enable the staff members to define custom treatments for these new classes as is described below.

Publication Process—Workflow Example

Figure 2:
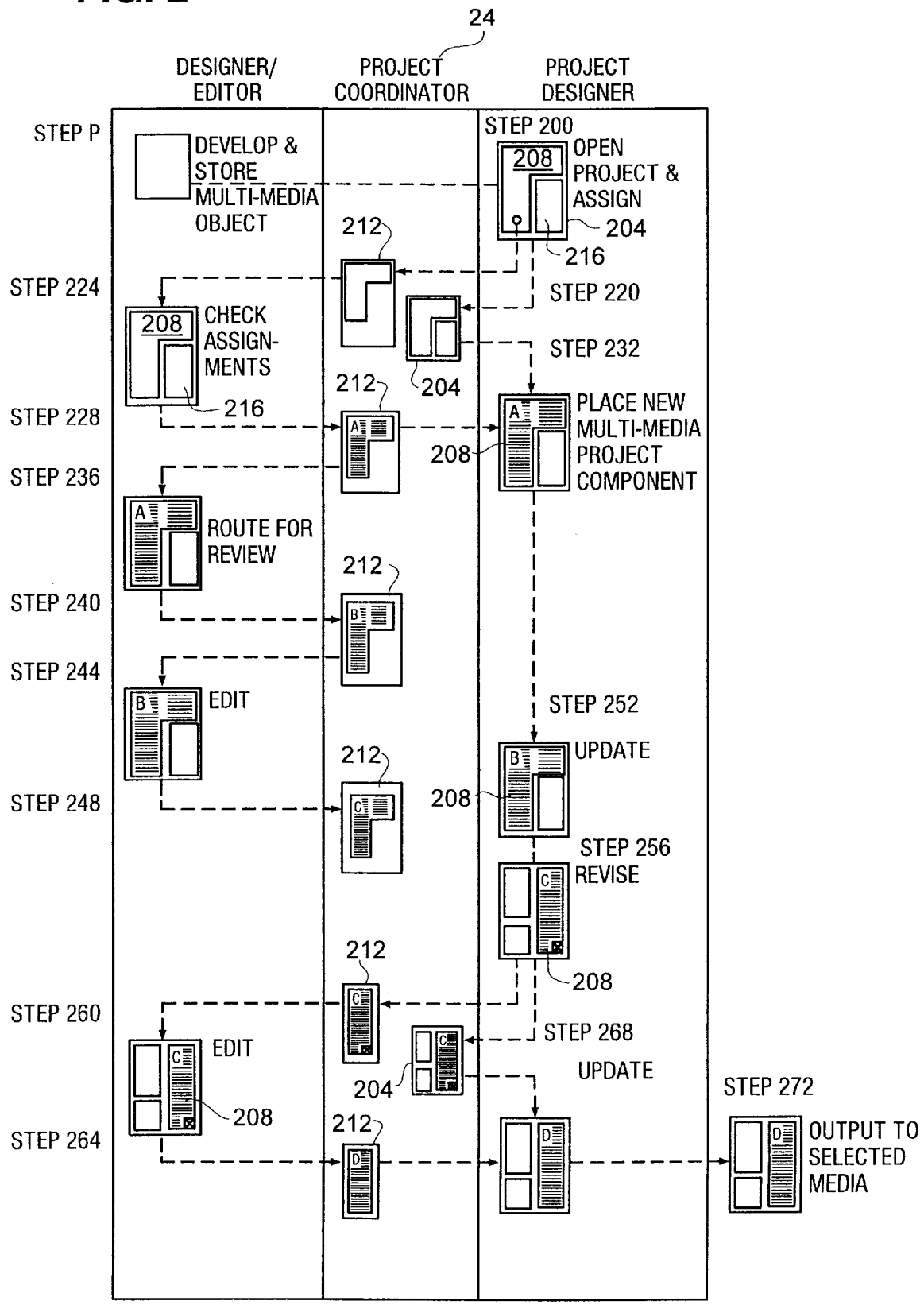
FIG. 2 illustrates a diagram of the workflow for creating a multi-media presentation using the multi-media project management and control system.

FIG. 2 illustrates an example of the workflow when the multi-media project management and control system 20 is used to manage the multi-media presentation development process for a single multi-media object. In particular, the retrieval, editing and production of a final instance of a single multi-media object is described to denote the steps taken by a designer/editor to develop a multi-media object for incorporation into the multi-media presentation. On another level, as described in more detail below, the plurality of multi-media objects are incorporated into the multi-media presentation by the multi-media presentation generation system MPG. In fact, the multi-media presentation generation system MPG enables a designer to create some multi-media objects as well as process a plurality of retrieved multi-media objects into the multi-media presentation. Therefore, FIG. 2 illustrates a conceptual view of the process and the specific implementation of the editing, and development steps noted therein may occur in any of a number of possible hardware/software systems that comprise the above-noted network that comprises the multi-media project management and control system 20.

The leftmost column of FIG. 2 contains the sequence of steps performed by a designer/editor using the multi-media object editing unit 52. The rightmost column contains the sequence of steps performed by a project designer using both the multi-media object assignment unit 40 and the project application software unit 44. The center column contains a description of the actions performed by the project coordinator 24.

As a preceding step P to this process, a media developer generates a multi-media object and checks this object into the multi-media project management and control system 20 where it is stored in file server 28. In step 200, having previously logged on to the multi-media project management and control system 20, the project designer checks-out or creates a multi-media presentation project file 204 which comprises a plurality of multi-media components, each of which comprises at least one multi-media object. Subsequently, using the multi-media object assignment unit 40, the project designer assigns a multi-media project component 208 to a specific designer/editor. This results in a multi-media object file 212 automatically being created with information containing, among other things, the identification of the designer/editor to whom the multi-media project component is assigned, the due date for the multi-media project component and a designation of the nature of the multi-media project component. Reference data is also inserted into the project file 204 associating the multi-media object file 212 with the multi-media project component 208. Once these actions have been accomplished, the project coordinator 24 can automatically notify the specified designer/editor of the new multi-media project component assignment. In step 220, the project designer then checks-in the project file 204. In step 224, when the designer/editor assigned to develop the multi-media objects corresponding to the multi-media object file 212 receives notification of the assignment, the designer/editor uses the multi-media object editing unit 52 to check-out the multi-media object file 212, via the multi-media object retrieval unit 56. Upon receiving the multi-media object file 212, the multi-media object editing unit 52 automatically displays the first page of the multi-media project component 208.

When the multi-media project component 208 is completed, the multi-media object file 212, containing the newly entered multi-media project component, is checked-in to the project coordinator 24 in step 228. If the project designer has the project file 204 checked-out, then the check-in of the multi-media object file 212 automatically causes a notification to be sent to the project designer indicating that the multi-media project component 208 has been updated. Otherwise, the project designer is automatically notified that the multi-media project component 208 has been updated whenever the project designer checks-out the project file 204. Thus, when the project designer again checks-out the project file 204 via the project application software unit 44 in step 232, the automatic notification of a change to the multi-media object file 212 provides the impetus for the designer to request an update to the project file 204 and its display via the project application software unit 44.

Independent of the actions of the project designer, the designer/editor again checks-out the multi-media object file 212 to edit it using the multi-media object editing unit 52. In step 240, the designer/editor checks-in the multi-media object file 212 with a designation that it should be routed to a second designer/editor for review. A notification is automatically sent to the project designer indicating the multi-media object file 212 has changed and, in addition, if a second designer/editor is logged on to the multi-media project management and control system 20, then a notification is automatically routed to the second designer/editor that the multi-media object file 212 is available for review. Upon notification in step 244, the second designer/editor checks-out and also edits the multi-media object file 212 using the multi-media object editing component 52 residing upon their processor. In step 248, the second designer/editor also checks-in the multi-media object file 212. In step 252, when the project designer again checks-out the project file 204 via the project application software unit 44, the designer is notified of the multi-media object file 212 change and can therefore request that an updated version of the multi-media object file 212 be incorporated into the project file 204. In step 256, the project designer subsequently decides to relocate the multi-media project component 208. Once notice is given to the project coordinator 24 of the project file 204 changes, the new geometry for the multi-media project component 208 is automatically written to the multi-media object file 212. Subsequently, assuming the designer/editor assigned to the article is logged on to the multi-media project management and control system 20 and has either checked-out the multi-media object file 212 or provided the data controller 32 with a query notification allowing the designer/editor to be notified whenever the geometry of the multi-media object file 212 changes, the project coordinator 24 automatically generates a notification which is sent to the assigned designer/editor indicating that the geometry for the multi-media project component has changed. In step 260, the assigned designer/editor checks-out the multi-media object file 212 to modify the multi-media project component 208. In step 264, the designer/editor checks-in the new version of the multi-media object file 212. As before, the project designer is automatically notified of the multi-media object file 212 change whenever the project file 204 is checked-out. Thus, in step 268 when the project designer checks-out the project 204, the project designer is notified of a new version of the multi-media object file 212. Finally, once all new multi-media objects have been incorporated into the project, the project designer in step 272 sends the project file 204 to the designated medium (not shown).

Project Coordinator Details

Figure 3:
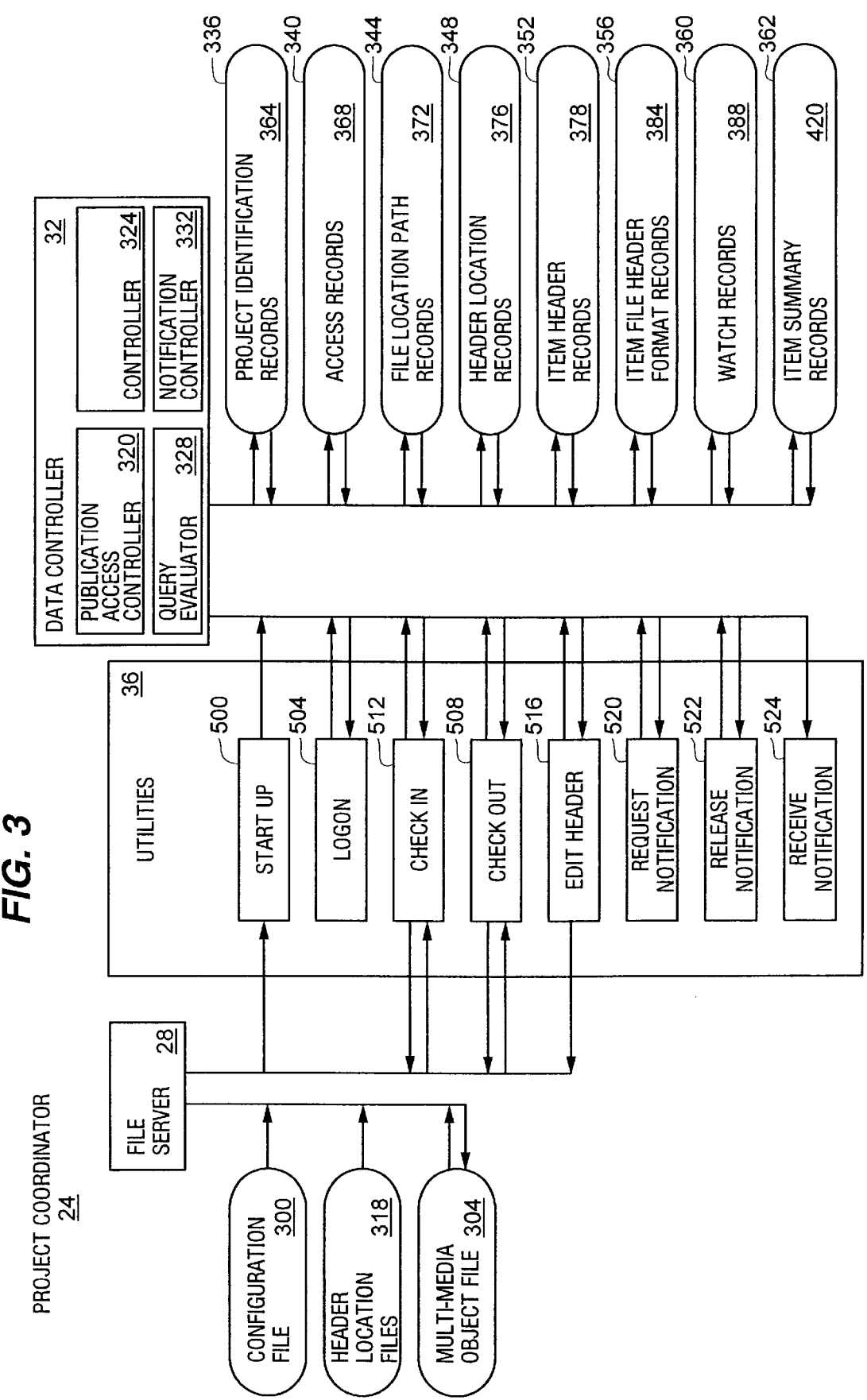
FIG. 3 illustrates a more detailed block diagram of the project coordinator than is given in FIG. 1.

FIG. 3 illustrates a more detailed view of the project coordinator 24. In particular, FIG. 3 discloses the data flows between the data repositories and the utilities 36. The file server 28 accesses the following files residing on the storage device: a configuration file 300 containing data required to initialize the multi-media project management and control system 20, the multi-media object files 304, and a collection of header file format files 318 for interpreting the file header information residing in each multi-media object file 304. More precisely, the configuration file 300 provides:

(1) the list of multi-media presentations known to the multi-media project management and control system 20;

(2) multi-media presentation access data specifying the access privileges of staff members to various multi-media object files 304; and (3) the file server 28 path names to the locations where the multi-media object files 304 are stored on the storage device.

Each multi-media object file 304 includes at least an item file header providing information about the contents of the file, a content area giving the multi-media object content data and a geometry area providing the data designating the location, orientation and shape of the multi-media object. Each item file header includes at least the following fields:

(1) a file name field giving the name for this item multi-media presentation file 304 by which the file server 28 can identify it;

(2) an item name field providing the name by which the multi-media object is displayed and known to a staff member;

(3) a check-out name field providing the identification of a staff member that has this multi-media object file 304 checked-out for exclusive use;

(4) a multi-media presentation name field providing the name of the multi-media presentation within which the multi-media object is being published;

(5) a section name field providing the name of the section within the multi-media presentation where the multi-media object is being published;

(6) a date due field providing the date of the next multi-media presentation deadline for the multi-media object;

(7) a content time stamp field providing the last date and time the content area was modified;

(8) a "routed-to" name field providing the name of a multi-media project management and control system 20 staff member to whom notification is given of the availability of the multi-media object file 304 upon check-in of the file assuming the routed-to staff member has established an appropriate query notification with the data controller 32;

(9) a status level field allowing a publisher to specify a status for the multi-media object; and

(10) any optional publisher specified fields desired.

Data Controller

The data controller 32 includes the following submodules: a multi-media presentation access controller 320, a multi-media object controller 324, a query evaluator 328 and a notification controller 332. The multi-media presentation access controller 320 controls access to the project coordinator 24 by establishing the validity of a staff member's logon name and password. In addition, the multi-media presentation access controller 320 also establishes the authorization of a staff member to access the multi-media objects 304 related to a selected multi-media presentation. Once access to the project coordinator 24 is granted, access privileges are checked to determine which multi-media presentation, multi-media presentation section and multi-media object type a staff member can potentially access as long as the multi-media project management and control system 20 client application being used by the staff member can process the multi-media object file type. To coordinate staff member requests to modify multi-media object files 304, the multi-media object controller 324 controls access to the multi-media object files 304 primarily by controlling access to the information contained in the item file header as is described below. To facilitate further coordination among multi-media project management and control system 20 staff members, the query evaluator 328 evaluates queries generated by requesters regarding item file header information. The notification controller 332 also facilitates staff member coordination in that it provides a requester with the capability to be automatically notified when certain project coordinator 24 events occur via the file notification and query notification capabilities. For instance, a requestor of a file notification is automatically notified whenever the notification controller 332 detects a change in a specific multi-media object file 304. In a publishing context, the predetermined event type changes for a multi-media object file 304 include changes to the item file header, changes to the content area, changes to the geometry area, deletion of the multi-media object file 304, check-in and check-out of the multi-media object file 304.

FIG. 3 illustrates a plurality of data stores 336–362 connected to the data controller 32. Each of these data stores contain information required by at least one of the above submodules 320–332 of the data controller 32. A description of each of the data stores follows:

(1) A collection 336 of multi-media presentation identification records 364, each of which contains the identification of a multi-media presentation known to the multi-media project management and control system 20.

(2) A collection 340 of access records 368, each of which contains the identification and multi-media presentation access privileges of a staff member.

(3) A collection 344 of file location path records 372, each of which contains a character string identifier giving the file server 28 path name to a storage area on the data storage device where multi-media object files 304 are stored.

(4) A collection 348 of header location records 376, each of which contains information designating the location of the item file header 308 within a specific type of multi-media object file 304.

(5) A collection 352 of item header records 378, each of which is a copy of an item file header.

(6) A collection 356 of item file header format records 384, each of which provides a description of the format of an item header record 378, equivalently, an item file header.

(7) A collection 360 of watch records 388 which is maintained by the notification controller 332. Each valid watch record 388 contains the information necessary to allow the notification controller 332 to do either a file notification or a query notification when a project coordinator 24 event related to the watch record 388 occurs.

(8) A collection 362 of item summary records 420, each of which provides access to substantially all information residing on the data controller device relating to a specific multi-media object file 304.

Included in the utilities 36 of the project coordinator 24 is a start-up utility 500 which initializes the data stores 336–362. Following execution of the start-up utility 500, the logon utility 504 must be used in order for a potential staff member to gain access to the multi-media project management and control system 20. Thus, the logon utility 504 can be invoked from any processor in the networked system of processors which comprise the publishing system, and executes on each such processor with the multi-media presentation access controller 320 determining a staff member's access privileges. Once a staff member is logged on, a multi-media object file 304 can be checked-out via the check-out utility 508 or, if already checked-out, then subsequently checked-in via the check-in utility 512. Thus, upon invoking the check-out utility 508 from the staff member's processor, the utility communicates with the multi-media object controller 324 to gain multi-media object access and with the file server 28 to retrieve a copy of the related multi-media object file 304. Conversely, upon invoking the check-in utility 512 from the staff member's processor, the check-in utility communicates with the multi-media object controller 324 to release the staff member's exclusive access to the checked-out multi-media object file 304, and subsequently provides the file server 28 with a new version of the multi-media object file 304 to be written to the storage device. As an alternative to checking-out a multi-media object file 304, the edit header utility 516 can be used to modify item file header 308 fields concurrently and substantially independently of the use of the check-out and check-in utilities 508, 512. A staff member invokes the edit header utility 516 from their processor, after which the utility communicates with the multi-media object controller 324 to obtain the desired item header record 378. Once obtained and modified as desired, the edit header utility 516 communicates the new header information to both the file server 28 and the multi-media object controller 324 to overwrite the item file header 308 and the item header record 378, respectively. The request notification utility 520 allows a requester to request either file notifications or query notifications from the notification controller 332. Moreover, note that such notifications can be set manually or automatically depending on whether the request notification utility 520 is invoked consciously by the staff member or the utility is invoked as a side-effect in response to some staff member action. While such a notification remains in effect, the requestor can be repeatedly notified of project coordinator 24 events relevant to the set notification request. The receive notification utility 524, preferably also residing on each processor, receives the notifications generated by the notification controller 332. Once a notification is received, the receive notification utility 524 determines whether sufficient information has been received to effectively allow the requestor to respond to the notification.

Page Based Document Layout Systems

Page based document layout systems are known for the print medium, and one such system presently available is titled "QuarkXPress," produced and distributed by Quark, Inc. This page based document layout system partitions document pages, as defined by the author, into a plurality of objects (also termed boxes and lines), each of which is independently editable by the author. The page based document layout system coordinates and manages the inputting of data into the plurality of objects and ensures that the populated objects are integrated into the final document page layout. The data that are input into these objects are static in nature, in that the data comprises print data: textual information and/or graphics. These types of data, when combined into the document page layout, represent the final presentation which is static in nature, being comprised of a plurality of static objects. This page based document layout system is menu driven, in that the author simply selects object characteristics from a set of menus to control the layout, content and presentation of the document page that is created. In this manner, the author can simply create a document and precisely regulate its presentation characteristics without the need to use complex programming languages. In addition, this system is layout driven in that the publication item is partitioned into a plurality of extents, whose contents are custom developed to fit the boundaries defined for the associated extent.

Figure 4:
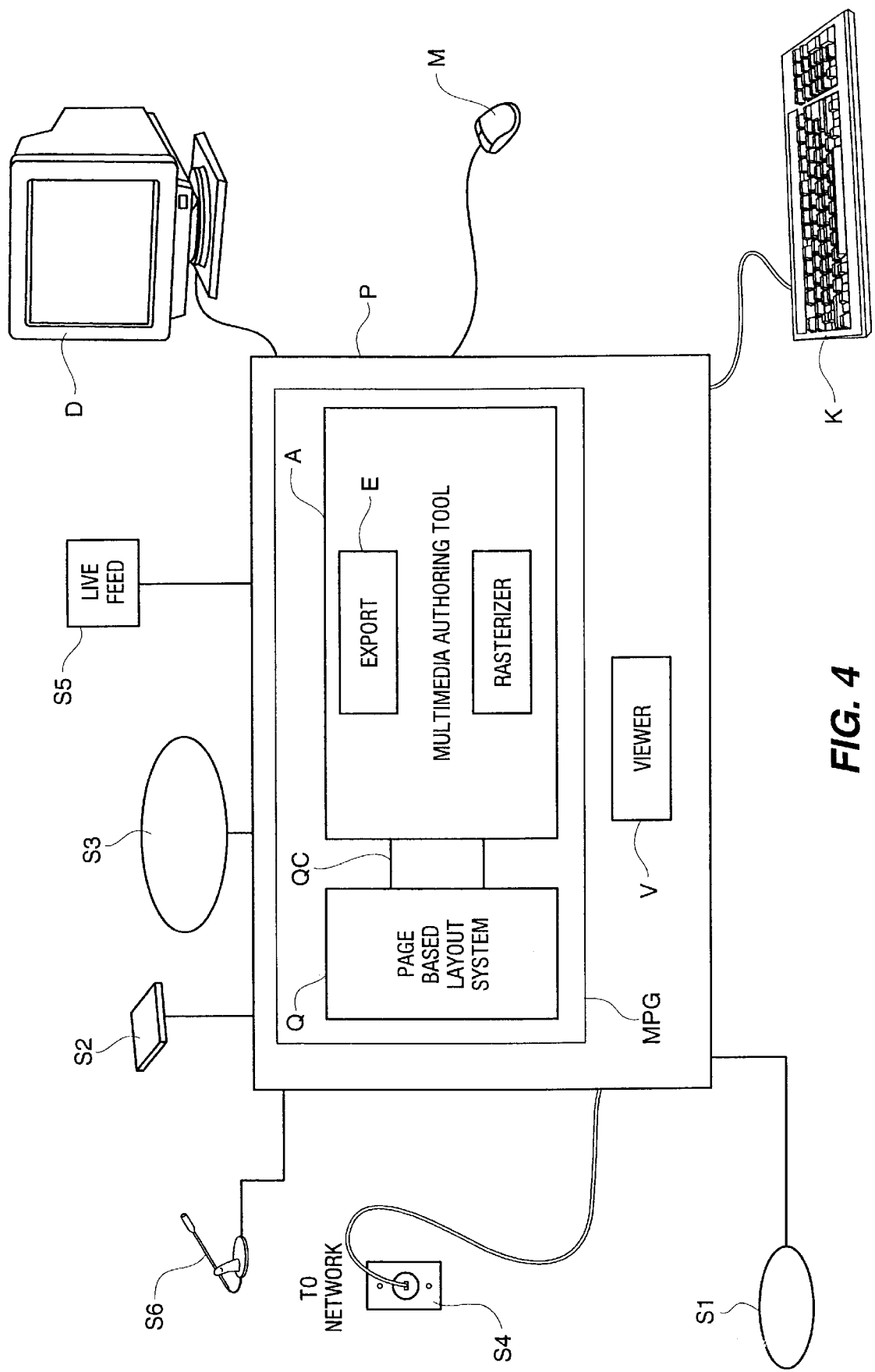
FIG. 4 illustrates, in block diagram form, the overall architecture of a multi-media presentation generation system.

The multi-media presentation generation system illustrated in FIG. 4 uses a multi-media authoring tool to extend the capabilities of the page based document layout system to the content driven paradigm of multi-media and to enable an author to merge both static and dynamic objects in the familiar page based layout environment to create the multi-media presentation. The dynamic objects available to the author include, but are not limited to: run time movies, animation, pop-up menus, interactive queries, audio, moving objects, and any other dynamic data that the author desires to include in the multi-media presentation. The selection of the various objects which comprise a page of the final multi-media presentation and the regulation of the object characteristics is accomplished in a menu based authoring environment maintained by the multi-media authoring tool. This system also enables the author to take existing documents prepared for a print medium and convert them to multi-media presentations. Another advantage of implementing the multi-media presentation generation system as an extension to the existing page based document layout system is that the tools and environment available in the page based document layout system are substantially the same tools available in the multi-media environment to layout and manipulate the multi-media presentations.

The multi-media authoring tool assigns a unique identification to each object that has multi-media information and that is located in the multi-media presentation, in the form of hidden information, to distinguish it from all static objects created in the presentation. The hidden information associated with each object defines the unique multi-media characteristics of the images displayed in the object and this hidden information is maintained by but is not necessarily accessed by the page based document layout system. Thus, the multi-media nature of these objects is transparent to the page based document layout system. The multi-media presentation generation system then creates an export object using this hidden information, and identifies the ownership of this object (page, window, no ownership, and the like) by considering the geometry of the object. This geometry information is defined by the page based document layout system, which functions to regulate the spatial relationships among the plurality of objects contained within the multi-media presentation.

Thus, the multi-media presentation generation system uses a multi-media authoring tool extension of a page based print document layout system to combine media objects of multiple diverse types into an integrated multi-media presentation. This system enables the author to take existing documents prepared for a print medium and convert them to multi-media presentations. Another advantage of implementing the multi-media presentation generation system as an extension to the existing page based document layout system is that the tools and environment available in the page based document layout system are substantially the same tools available in the multi-media environment to layout and manipulate the multi-media presentations. This system operates without the complex frame based, script language environment of some prior systems, since it is based on a desktop publishing environment. There is also no need for programming expertise to author multi-media presentations. This system does not require the author to work on logical and visual abstractions of both objects and the viewable screens on which they appear. Thus, the multi-media presentation generation system of the present invention Basic System Architecture FIG. 4 illustrates, in block diagram form, an architectural diagram of a multi-media presentation generation system which comprises a menu driven multi-media presentation generation system MPG, executing on a processor P, which accesses data from any of a multitude of media sources S1–S6, which data is in any of a multitude of formats and contents for integration into an adaptable product which represents the multi-media presentation. The basic architecture of the multi-media presentation generation system is a multi-media authoring tool which operates in conjunction with a page based document layout system to extend the menu based, static object manipulation capability of the page based document layout system to encompass dynamic multi-media objects.

One element of this multi-media presentation generation system MPG comprises a page based document layout system Q which functions to define the basic workspace for the user into which the plurality of media objects are imported. In particular, the page based document layout system Q includes a page layout capability which enables the user to define a workspace of predetermined physical extent, generally in a two dimensional mode, which workspace is divided by the user into a plurality of objects. Each of these objects comprise a segment of the workspace and do not have extents that project beyond the boundaries of the workspace. The plurality of objects in the workspace are either disjunct, or overlap or are physically contiguous within the workspace. The user defines the content and function of each of these workspaces individually as well as their integration with the other objects in the workspace to form the entirety of the presentation.

The multi-media presentation generation system MPG also comprises a software extension feature QC which functions to interconnect the page based document layout system Q with at least one source of media objects S1–S6 and with a multi-media authoring tool A. The multi-media authoring tool A is interconnected with the page based document layout system Q via the existing published interfaces of the software extension feature QC of the page based document layout system Q. This system could alternatively be accomplished by wrapping the multi-media authoring tool A directly into the page based document layout system Q, without it having to be an extension. In either case, the multi-media authoring tool A operates in conjunction with the page based document layout system Q to extend the menu based, static object manipulation capability of the page based document layout system Q to encompass dynamic multi-media objects. The dynamic objects each comprise viewable data which is presented pursuant to a set of parameters, which regulate the generation and presentation of the resultant images independent of the other objects which comprise the multi-media presentation. These dynamic objects produce their images in their defined extent without requiring the regeneration of the remainder of the presentation image.

The sources of media objects S1–S6 are graphics downloaded from external sources, such as CD-ROM S1 or disk drive S2, graphics generated by additional software resident on the processor P or graphics that are scanned into the system via a peripheral device. Furthermore, video information likewise is obtained from a plurality of external sources including, but not limited to, data communication connections S4 to the file server 28 of the multi-media project management and control system 20 or to broadcast media, such as Internet or broadcast television, video tape recorders S3, or live feeds S5 from a camera or other such appropriate source of video information. Audio information is input to the multi-media presentation generation system MPG via microphone S6, radio receiver, data communications source S4 or any similar audio source of data. The textual information is directly input by the user into the page based document layout system Q or is obtained from a word processor or from a data communication source S4 or a peripheral device, such as a document scanner. The above-noted data also includes audio/video files and still images. These types of media and the media sources are simply noted herein to indicate the diversity of information which is used by the multi-media presentation generation system MPG to perform the multi-media object creation.

Underlying Page Based Document Layout System

The underlying page based document layout system is a menu based system which functions to partition document pages, as defined by the author, into a plurality of objects (also termed boxes), each of which is independently editable by the author. The page based document layout system coordinates and manages the inputing of data into the plurality of objects and ensures that the populated objects are integrated into the final document page layout.

For the purpose of illustration, the page based document layout system Q illustrated in FIG. 4 is the commercially available QuarkXPress product. QuarkXPress is document publishing software which is used to create a multi-media presentation in a print medium. The QuarkXPress system enables a designer to plan and design a print multi-media presentation. The designer selects the page size, margin widths, number of columns, type faces, type styles, color, and the like. This system includes word processing capability to enable an editor and/or designer to cut, copy, paste and delete text. The graphic artists use this system to create the illustrations, photographs and other graphic elements which accompany the text. The system imports scanned static pictures and computer generated graphics. These various static elements are combined via page layout features, including the use of templates, to enable a created page format to be used repeatedly on various documents. Typographic polishing is available to precisely adjust word and character spacing, hyphenation and justification. Imported pictures are framed, rotated, skewed, resized cropped, and the like. Background color is available as well as text run around capability to wrap text around pictures and illustrations.

The QuarkXPress page based document layout system Q utilizes boxes and lines to manage the document space. The multi-media authoring tool A also uses the boxes and lines of the page based document layout system Q, but for multi-media content, with the hidden information which defines the multi-media content and attributes of these boxes and lines being stored therein to distinguish the multi-media objects. Therefore, the term "object" as used herein encompasses the boxes, lines and the like, whether or not their content is multi-media in nature. The objects comprise the user definable space into which the viewable content is placed for incorporation into the document. The objects have both a position (locus) on the document page and an extent in the two dimensional space of the document page. In particular, text is contained in text objects QTB while pictures are contained in picture objects QGB. Therefore, to place text in a particular location on the document page, a text object QTB must be created at this site. Text objects QTB and picture objects QGB are the basic building blocks of a document. When an object is active, the user modifies it using the controls listed in the text object QTB specifications or picture object QGB specifications. The text objects QTB, picture objects QGB and lines on a QuarkXPress page behave in much the same way as the halftones, galleys of type and press-on rules used in traditional production environments: each item is either in front of or behind other items. The "stacking order" is a term which refers to the front/back relationships among the various items of a page layout. An object that is in front of another item obscures the item behind unless the object has a background color of "none" which renders the object transparent, except for its contents. The multi-media authoring tool A uses these properties of objects, managed by the page based document layout system Q, to author the multi-media presentation. A plurality of menus are provided to enable the user to edit and manage the document, its various pages and the objects that are created for placement thereon. Each menu displays entries which are grouped according to the operation that they perform.

Extensions To The Page Based Document Layout System

QuarkXPress has an open architecture that enables a developer to add new functions and features to the basic page based document layout system Q. This function and feature addition is accomplished by use of the paradigm known as extension software QC, which is an interface which incorporates extension modules, each written using a standard set of instructions, into the underlying page based document layout system Q. The extension module is treated as part of the basic page based document layout system Q, since it is written using the predefined set of program instructions and is formatted to be compatible with the page based document layout system Q. As with any instruction set, there are standard definitions of the functions, the return types, parameter types, data structures and the like. The page based document layout system Q, upon being launched, opens the extension modules in its home folder and passes opcodes to the extension modules to provide an indication of the present state of the processor. The extension modules review the received opcodes to determine whether they represent a stimulus to which this specific extension module is programmed to respond. If so, the extension module performs the programmed action(s). Multiple extension modules are capable of being operational on the same processor and also operate on the same document which is created.

The multi-media presentation generation system MPG is implemented as the addition of at least one extension module (such as multi-media authoring tool A) to the page based document layout system Q. This multi-media authoring tool A makes use of the features and capabilities of the page based document layout system Q and adds multi-media capabilities to these features. One advantage of implementing the multi-media presentation generation system MPG as an extension to the existing page based document layout system Q is that users who are familiar with the tools available in the page based document layout system Q use the same tools in the multi-media environment to layout and manipulate the multi-media presentations. In addition, the capabilities of the page based document layout system Q are available to the user, including, but not limited to: precise placement of objects, grouping of objects, master pages, control of all aspects of text manipulation, use and control of color, and the like. Furthermore, this system enables the author to take existing documents prepared for a print medium and convert them to multi-media presentations.

The expansion of the various objects of the page based document layout system Q by means of the extension software QC results in documents becoming multi-media presentations, with document pages corresponding to multi-media display screens. In addition, the QuarkXPress objects (text and picture objects, lines, and the like) of the page based document layout system Q become multi-media objects, such as: buttons, hot areas, text objects, movies, animations, pop-up menus, windows and the like. The text becomes "hot text" that performs a desired action when the user positions the cursor on the hot text and clicks the mouse. Thus, the multi-media presentation generation system MPG is an extension to the existing page based document layout system Q which expands the static elements of the page based print environment to dynamic elements of the multi-media environment. In addition, the multi-media presentation generation system MPG is itself extensible to enable developers to add features to the basic program in a manner analogous to the extension capability of the page based document layout system Q.

System Operation for Multi-Media Presentation Creation

Figure 5:
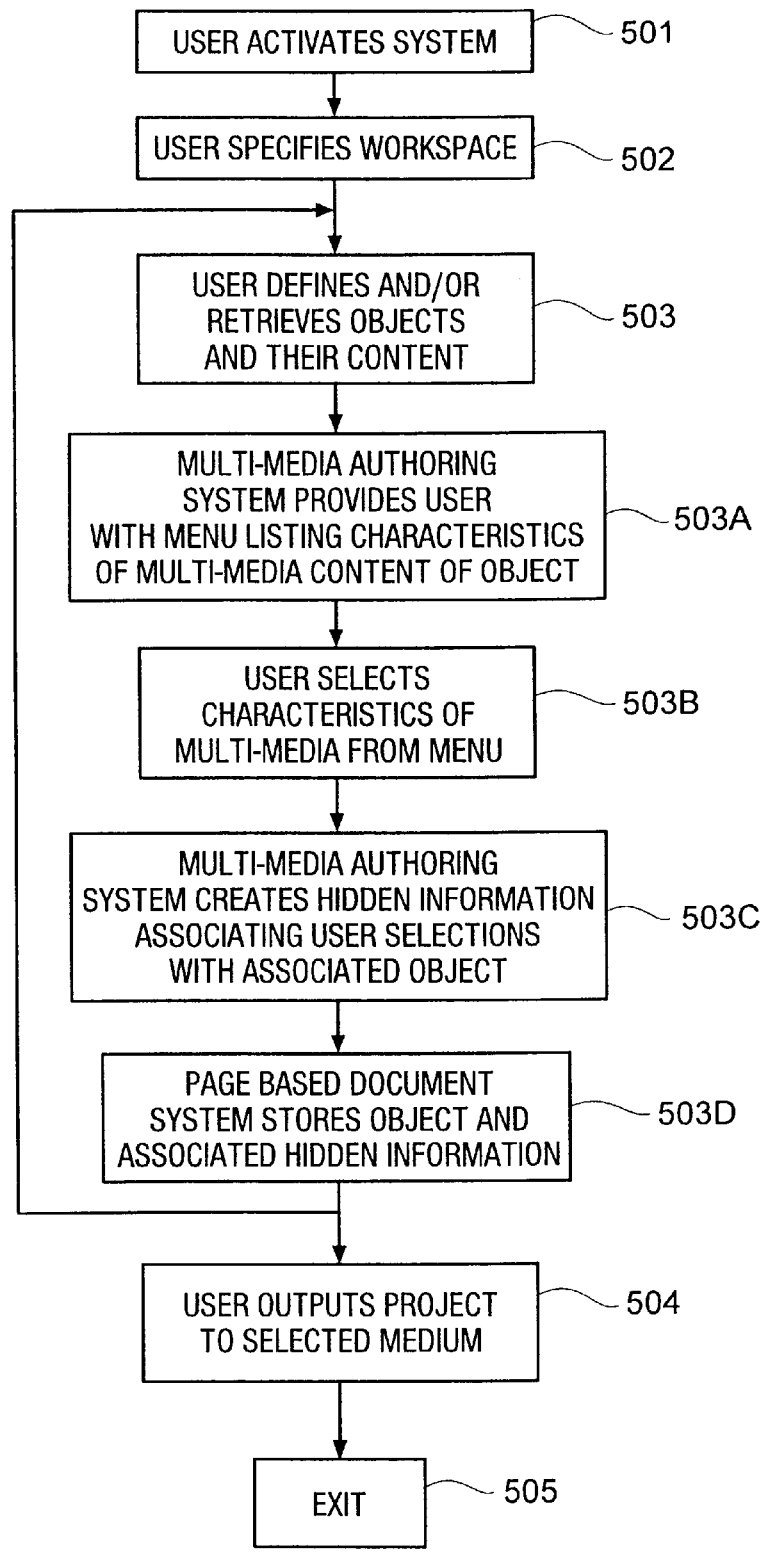
FIG. 5 illustrates, in flow diagram form, the operation of the multi-media presentation generation system in creating and viewing a multi-media presentation.

In operation, the user typically interacts with the multi-media presentation generation system MPG by means of a keyboard K and/or a mouse M or other such user input device. In particular, as shown in flow diagram form in FIG. 5, the user activates the multi-media presentation generation system MPG at step 501 and is provided with a prompt to thereby enable the user to define a baseline point of reference, such as a page layout. In step 502, the user specifies the extent of the workspace which represents the final image that is produced for the end user. The multi-media authoring tool A of the multi-media presentation generation system MPG displays the queries on the display device D that is part of the system to enable the user the view the prompts from the multi-media presentation generation system MPG and respond thereto by inputting data via the keyboard K and/or mouse M. The user thereby defines the basic parameters with which the multi-media presentation generation system MPG must work. In a typical application, the designer defines a presentation display device D of certain size and characteristics. The designer therefore defines the page layout to comprise the physical extent of a display device, which has certain technical characteristics such as color, resolution, etc. Once the user has defined the basic page extent, the multi-media authoring tool A prompts the user at step 503 to define the plurality of regions (objects) within the workspace into which various objects are to be inserted. These objects are typically retrieved from the file server 28 of the multi-media project management and control system 20 which comprises a repository of multi-media objects for use in the project development process.

The multi-media authoring tool A at step 503A provides the user with a set of menus via the display device D to enable the user at step 503B to define the number and physical extent of the regions within the workspace. In defining the regions of the workspace, the user is not constrained to select a single media type for use in that region but can have multiple concurrently active media types within a single workspace and within a single region of the workspace to thereby enable a plurality of multi-media presentations to concurrently be extant on the user's display. Since the underlying document layout system Q is page based, the definition of the workspace is described herein in terms of a page and portions of a page to thereby simplify the understanding of the invention. However, there is no inherent limitation in the architecture of the multi-media presentation generation system MPG that requires limitation of the invention to a physical page of information or a print medium which typically is implied by the use of the word "page." Indeed, given that the end product is multi-media in nature, the output can be destined for a display medium that is print in nature or audiovisual or multi-media, in the form of a computer display. Regardless of the form of the display medium, the multi-media authoring tool A functions to automatically integrate a plurality of source modules into a dynamic presentation with the objects used to populate the presentation screen being independent of yet integrally coupled to the page based document layout system Q via the connection software QC.

Implementation of Various Multi-Media Objects

The following description notes the effects of the user selecting various objects in this system. In this description, the menu paradigm includes the palette which is produced by the multi-media presentation generation system MPG. This palette consists of several panels, a number of which are described below.

Page Panel—When the user of the multi-media presentation generation system MPG selects the Page panel of the palette and specifies the display and action specifics of this element, the page definition data is transmitted from the multi-media authoring tool A to the page based document layout system Q, where the page definition data is stored inside the QuarkXPress page. The multi-media authoring tool A retrieves this stored page definition data for display and editing by the user. The page definition data is also retrieved from storage when the multi-media presentation is activated or exported, with this data being used to define the multi-media presentation as is described in additional detail below.

Object Panel—When the user of the multi-media presentation generation system MPG selects the Object panel of the palette and specifies the display and action specifics of this element, the object definition data is transmitted from the multi-media authoring tool A to the page based document layout system Q, where the object definition data is stored inside a corresponding QuarkXPress object. The multi-media authoring tool A retrieves this stored object definition data for display and editing by the user. The object definition data is also retrieved from storage when the multi-media presentation is activated or exported, with this data being used to define the multi-media presentation. There are typically limitations on the object definitions which represent constraints of the system. For example, a text object is used to implement multi-media objects which include: basic, animation (item on a path), pop-up menu, text object and window. A picture object is used to implement multi-media objects which include: basic, animation (any kind), movie, pop-up menu and window, while a line is used to implement multi-media objects which include: basic, animation (item on a path). Furthermore, button objects are created through a button library pixel editor which is resident in the multi-media authoring tool A and are similar to picture objects in the page based document layout system Q.

Script Panel—When the user of the multi-media presentation generation system MPG selects the Script panel of the palette and specifies the display and action specifics of this element, the script definition data is transmitted from the multi-media authoring tool A to the page based document layout system Q, where the script definition data is stored inside the QuarkXPress document. The multi-media authoring tool A retrieves this stored script definition data for display and editing by the user. The script definition data is also retrieved from storage when the multi-media presentation is activated or exported, with this data being used to define the multi-media presentation. The script definition data is saved to a file and also loaded into the multi-media presentation from a file.

Hot Text Panel—When the user of the multi-media presentation generation system MPG selects the Hot Text panel of the palette and specifies the display and action specifics of this element, the hot text definition data is transmitted from the multi-media authoring tool A to the page based document layout system Q, where the hot text definition data is stored inside the corresponding QuarkXPress text element. The multi-media authoring tool A retrieves this stored hot text definition data for display and editing by the user. The hot text definition data is also retrieved from storage when the multi-media presentation is activated or exported, with this data being used to define the multi-media presentation. In addition, hidden text marker characters are placed at the beginning and end of the text selection range of the text to delineate the hot text object. Additional hidden text is stored within the range defined by these delimiters to describe the user events and actions that are associated with this hot text item. This additional text is typically stored immediately following the beginning marker character.

Keys Panel—When the user of the multi-media presentation generation system MPG selects the Keys panel of the palette and specifies a key command, the key and script data is transmitted from the multi-media authoring tool A to the page based document layout system Q, where the keys definition data is stored inside the corresponding QuarkXPress page or master page. The multi-media authoring tool A retrieves this stored keys definition data for display and editing by the user. The keys definition data is also retrieved from storage when the multi-media presentation is activated or exported, with this data being used to define the multi-media presentation.

Referenced Files—The multi-media presentation generation system MPG references other files which reside outside of the boundaries of the multi-media presentation generation system MPG and the multi-media presentation which is generated by this system. These referenced files are any of a number of types of files, stored in various locations, which include, but are not limited to: sounds, QuickTime™ movies, animations, cursors, index files, other multi-media presentations, EPS files, AppleScript™ files. Reference information for these files is transmitted from the multi-media authoring tool A to the page based document layout system Q, where the reference data is stored inside the corresponding QuarkXPress document. The multi-media authoring tool A retrieves this stored reference data for display and editing by the user. The reference data is also retrieved from storage when the multi-media presentation is activated or exported, with this data being used to define the multi-media presentation.

Authoring in the Multi-Media Authoring Tool

The multi-media authoring tool A extends the features and capabilities of the underlying page based document layout system Q to address the multi-media objects used by the multi-media authoring tool A. In particular, the menu capability of the underlying page based document layout system Q is expanded by the multi-media authoring tool A to include menus which list the multiple types of media that are available from the media sources S1–S6 as well as the editable and presentation characteristics associated with each media type. The underlying page based document layout system Q is equipped with standard well-defined interfaces, via the extension software QC, which enable the multi-media authoring tool A to integrate its features and user interfaces with the underlying page based document layout system Q.

The multi-media authoring tool A creates at step 503C QuarkXPress documents with additional information appended thereto, termed "hidden information," which additional information relates to the objects placed on the pages of the multi-media presentation. The multi-media authoring tool A sometimes places a header on the created page, which header uniquely identifies the page as part of a multi-media presentation. In addition, each object with multi-media information that is created and located on the identified page is assigned a unique identification to distinguish it from all other objects created in the system. The hidden information associated with each multi-media object contains data which defines the unique multi-media characteristics of the presentation displayed in the object and this hidden information is not accessed by the page based document layout system Q. Thus, the multi-media nature of these objects is transparent to the page based document layout system Q and yet these objects are managed by the page based document layout system Q at step 503D using its existing page layout capabilities.

The objects created by the multi-media authoring tool are therefore transparent to the basic layout system due to the transformation process executed as described above. These objects are used by the multi-media multi-media presentation management and control system 20 as the multi-media objects in the manner noted above. At step 504, the user outputs the resultant multi-media presentation to the selected medium for storage thereon. The process then exits at step 505.

Summary

Thus, the multi-media presentation generation system is operable with the multi-media project management and control system, which functions to manage the development of a multi-media presentation by controlling the task assignments associated with the retrieval, development and integration of the plurality of multi-media objects which comprise the multi-media presentation. The multi-media presentation is content driven rather than layout driven as in the print medium case and the management of the multi-media project must follow this different paradigm. The implementation of the multi-media object generation and editing functions can be within the multi-media presentation generation system or can be implemented in other software components extant on the processors which comprise the network that is used to implement the multi-media project management and control system.

We claim:

1. An apparatus for coordinating access among a plurality of staff members, who work together to produce multi-media presentations, to a plurality of multi-media objects of a multi-media presentation which comprises at least one presentation page, said at least one presentation page capable of being rendered as a multi-media display on a display device, said apparatus comprising:

means for producing a page layout for a presentation page, said page layout comprising a plurality of multi-media objects, each multi-media object having header, content and geometry sections which define multi-media object characteristics, a content of an image created from said multi-media object, and a locus of said image created from said multi-media object on said multi-media display, respectively;

means for defining at least one multi-media object for inclusion in said presentation page, comprising:
   means for identifying a multi-media object,
   means for presenting a set of multi-media object characteristics to an author for said identified multi-media object,
   means for associating, in response to said author selecting ones of said multi-media object characteristics for said identified multi-media object, said selected multi-media object characteristics with said identified multi-media object;

means for integrating said at least one multi-media object with said page layout to create said presentation page;

means for coordinating access to said multi-media objects among a number of said plurality of staff members, each of said multi-media object content and said multi-media object header for a selected multi-media object being able to be accessed and modified simultaneously by a plurality of different staff members to achieve coordinated changes related to said selected multi-media object.

2. The apparatus of claim 1 further comprising:

means for defining a static image for inclusion in said presentation page, wherein at least two of said multi-media objects on said page layout define images which are static in content, comprising:
   means for identifying each of said at least two static multi-media objects;
   means for rasterizing each said identified static multi-media object; and
   means for combining said rasterized identified static multi-media objects into a rasterized static image.

3. The apparatus of claim 2 further comprising:

means for rasterizing said at least one multi-media object; and wherein said means for integrating combines said rasterized at least one multi-media object with said rasterized static image to create said multi-media display.

4. The apparatus of claim 3 further comprising:

means for transmitting said plurality of multi-media objects which comprise said presentation page to a destination via a communication medium.

5. The apparatus of claim 4 further comprising:

means for activating a viewer, executable at said destination, for executing said presentation page transmitted via said communication medium to said destination to create said multi-media display on a display device which is located at said destination.

6. The apparatus of claim 3 further comprising:

means for processing said presentation page to form a non-editable image for presentation to a user on said display device.

7. The apparatus of claim 6 further comprising:

means for initiating a predefined action corresponding to a user-selectable locus on said non-editable image, said user-selectable locus being activatable by a user input device.

8. The apparatus of claim 7 further comprising:

means for translating, in response to a user selecting, via said user input device, a user-selectable locus on said image which is presented on said display device, said user initiated action corresponding to said user-selectable locus into presentation of said data forming a one of said multi-media objects.

9. The apparatus of claim 1 wherein said means for defining multi-media objects defines at least one of the class of elements which include, but are not limited to: background, image, rasterized text, movie, non-rasterized text, window, animation, path for animation, pop-up menus, lists, interactive controls.

10. The apparatus of claim 1 wherein said means for presenting said set of multi-media object characteristics includes but is not limited to presenting: location, size, orientation, transformation, path and velocity of motion, color, content.

* * * * *

UNITED STATES PATENT AND TRADEMARK OFFICE
CERTIFICATE OF CORRECTION

PATENT NO : 6,005,560
DATED : December 21, 1999
INVENTOR(S) : Timothy Earl Gill et al.

It is certified that error appears in the above-identified patent and that said Letters Patent is hereby corrected as shown below:

On title page, item 75 Inventors
replace "John David Williams, Jr."
with --John David Williams, II--.

Signed and Sealed this

First Day of August, 2000

*Attest:*

Q. TODD DICKINSON

*Attesting Officer*     *Director of Patents and Trademarks*